United States Patent [19]

Reurich

[11] Patent Number: 5,615,902
[45] Date of Patent: Apr. 1, 1997

[54] WHEELED CABINET WITH SELF-LEVELLING REMOVABLE TRAYS

[76] Inventor: Peter Reurich, 15 The Appian Way, Clareville Beach, NSW 2107, Australia

[21] Appl. No.: 507,367
[22] PCT Filed: Feb. 23, 1994
[86] PCT No.: PCT/AU94/00077
    § 371 Date: Aug. 22, 1995
    § 102(e) Date: Aug. 22, 1995
[87] PCT Pub. No.: WO94/19224
    PCT Pub. Date: Sep. 1, 1994

[30] Foreign Application Priority Data

Feb. 23, 1993 [AU] Australia .................. PL7442

[51] Int. Cl.⁶ .................................................. B62B 1/16
[52] U.S. Cl. ........................... 280/47.18; 280/47.19; 280/47.35
[58] Field of Search ...................... 280/47.26, 35, 280/47.18, 47.19, 47.16, 47.35, 79.11, 79.2, 47.2

[56] References Cited

U.S. PATENT DOCUMENTS

| D. 338,306 | 8/1993 | White | 280/47.18 |
| 4,717,020 | 1/1988 | Viira | 206/372 |
| 5,159,777 | 11/1992 | Gonzalez | 280/47.19 |
| 5,308,012 | 5/1994 | Fuller | 280/47.19 |
| 5,452,908 | 9/1995 | Bencic | 280/47.18 |

FOREIGN PATENT DOCUMENTS

| 0319969A1 | 6/1989 | European Pat. Off. . |
| 0360987A1 | 4/1990 | European Pat. Off. . |
| 3217728A1 | 11/1983 | Germany . |
| 353982 | 8/1931 | United Kingdom . |
| 2138751 | 10/1984 | United Kingdom . |

*Primary Examiner*—Anne Marie Boehler
*Attorney, Agent, or Firm*—Townsend and Townsend and Crew LLP

[57] ABSTRACT

A wheeled cabinet (1) having a first compartment (4) and a second compartment (5) hingedly connected thereto. Removable trays (12) are pivotally located in each compartment (4 and 5) such that under the influence of gravity they maintain a horizontal position. The cabinet (1) is provided with wheels (8) located at its base and roller elements (7) located on its handle (6) to assist in movement of the cabinet both in an inclined and a lay down position.

3 Claims, 5 Drawing Sheets

1

WHEELED CABINET WITH SELF-LEVELLING REMOVABLE TRAYS

The present invention relates to a wheeled container for transporting small items and implements such as tools for the use by carpenters and tradesmen, and associated electrical equipment such as sanders, portable saws and the like.

Presently tradesmen have at their disposal small hand carried tool boxes which, while easy to carry to site, cannot contain much equipment. Further there are large mobile cabinets with sliding drawers into which can be placed more equipment than with the hand carried tool boxes. Such cabinets are shown in example in U.S. Pat. No. 2,905,480 to Giovannelll. However these mobile cabinets are not readily moveable from site to site. Further the cabinets cannot be tipped to any large angle as the contents in the drawers tend to slide around and occasional fall from the drawers.

Efforts have been made to provide hand carts for varied uses such as the fishing cart described in U.S. Pat. No. 5,159,777 to Gonzalez, a domestic wheeled carrier described in United Kingdom patent 732276 to Hill, a battery cart described in U.S. Pat. No. 2,579,639 to Adams, and a trash container described in U.S. Pat. No. 4,984,704 to O'Malley.

However, none of these have the advantages of the present invention.

The present invention seeks to ameliorate the disadvantages of the prior art by providing a wheeled container comprising:

A cabinet having a first compartment; a second compartment hingedly connected to said first compartment, said second compartment moveable between a closed position, whereby access to said first compartment and said second compartment is prevented, and an open position allowing access to both said first compartment and said second compartment;

tray means having a tray body in which to receive items, side support means extending upwardly from each side of said tray body, a handle joining across said side support means, and engagement means located in each of said side support means;

holding means located on each side of said first and second compartments; whereby said engagement means pivotally releasably engages a respective holding means in either the first or second compartments such that each tray means is pivotally held between two opposed engagement means and can pivot around said two engagement means without interfering with the movement of adjacent tray means or touching the cabinet when the orientation of said wheeled container is altered, thus keeping the tray bodies in a substantially horizontal position;

wheels located at or adjacent the back bottom edge of said cabinet;

a handle located at or adjacent the top back edge of said cabinet; and roller elements located on said handle to allow the cabinet to easily move on said roller elements when said wheeled container is laid over.

The invention will now be described by way of example with reference to the accompanying drawings in which.

Whilst the present invention can be utilized to carry many different types of items for many uses, it is particularly suitable for tradesmen, mechanics and home handymen.

Figure 1:
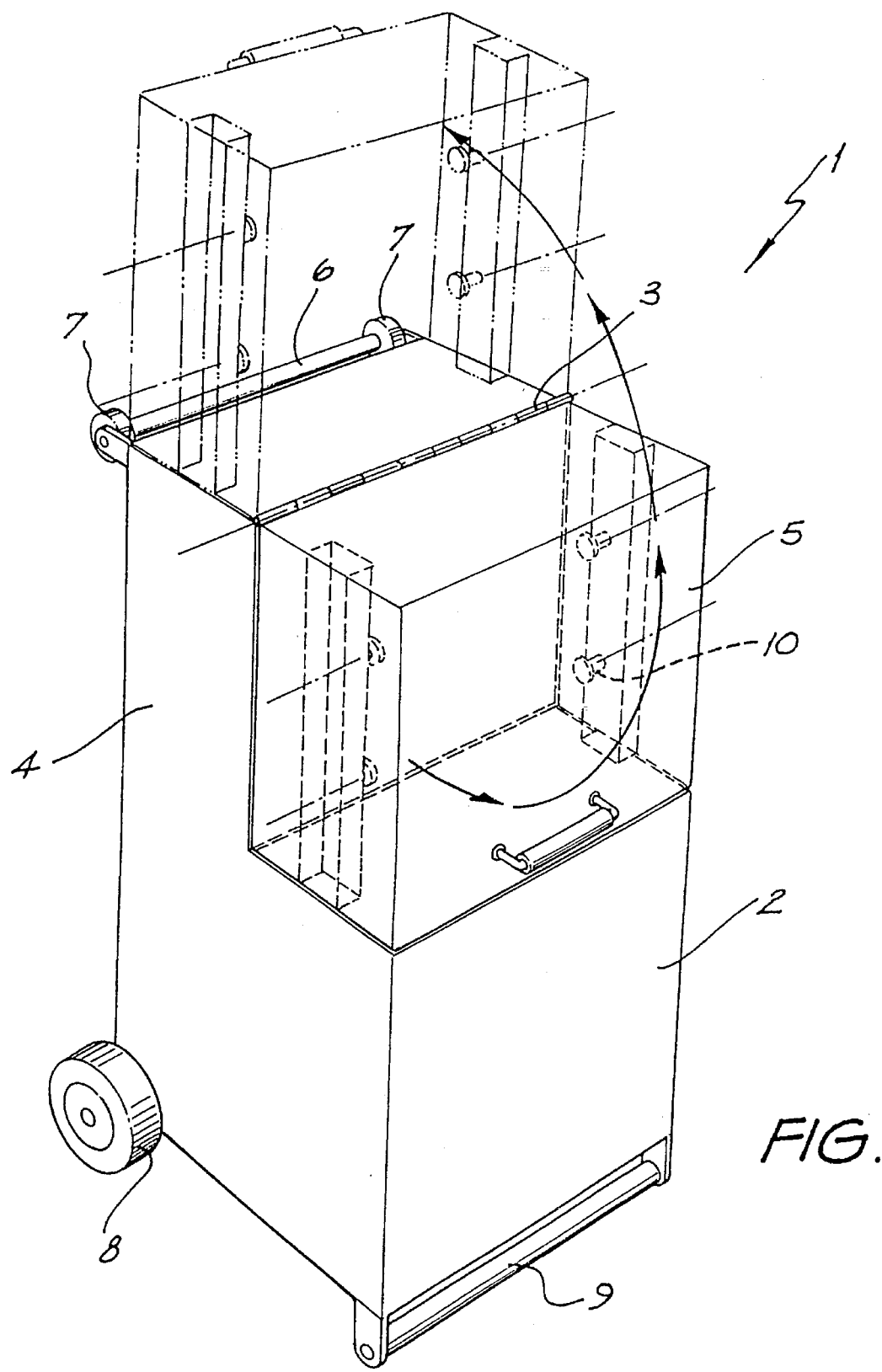
FIG. 1 illustrates a wheeled container according to one embodiment of the present invention.

One embodiment of the invention is shown in FIG. 1 wherein the wheeled container (1) comprises a cabinet (2). Hingedly connected by hinge (3) to a compartment (4) is compartment (5).

Located at the top edge of the back of the cabinet (2) is a handle (6), on which are located roller elements (7) in the form of wheels. Located at or adjacent the bottom back edge of the cabinet (2) are a set of wheels (8). A further handle (9) is located at or adjacent the front bottom edge of the cabinet.

Figure 8:
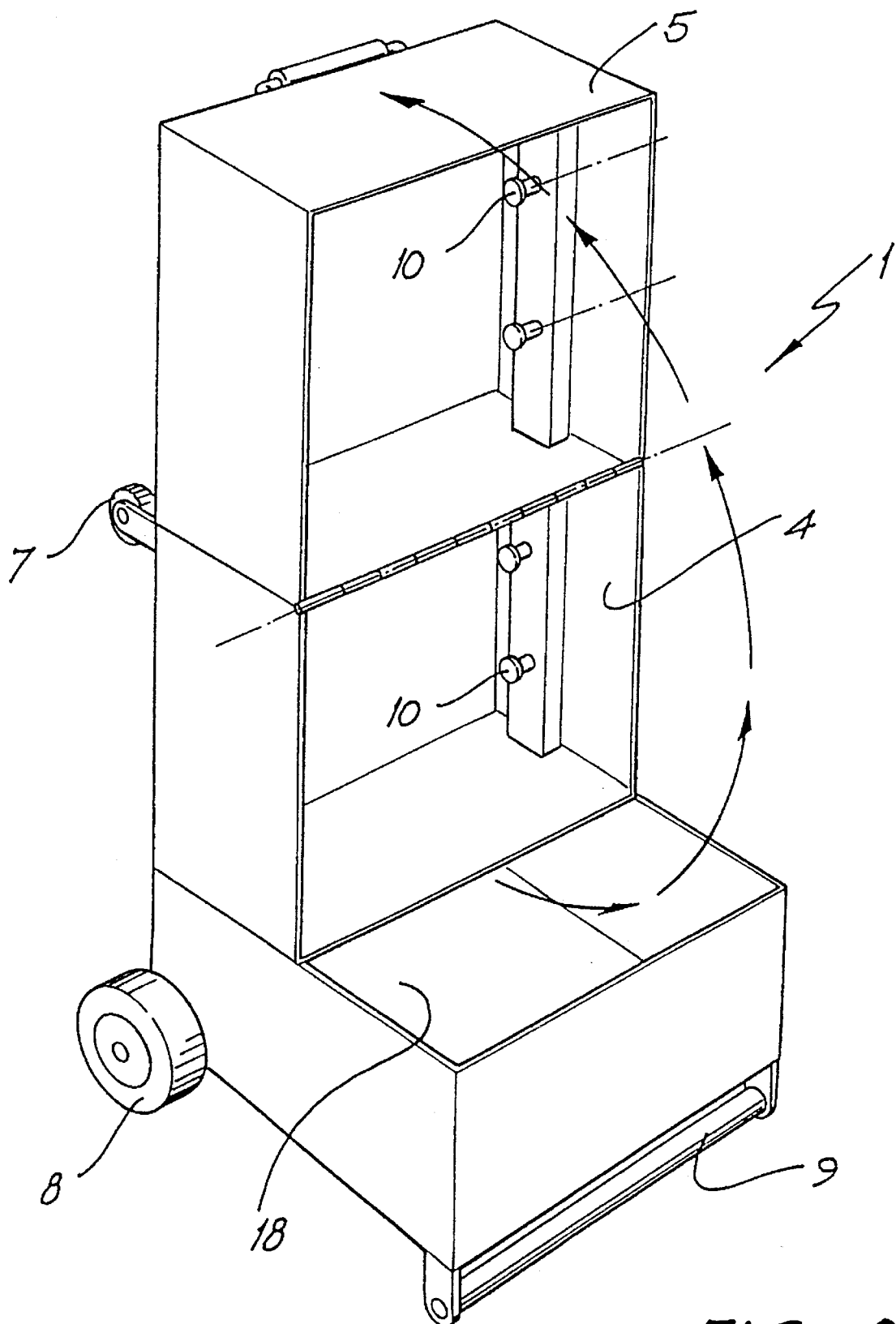
FIG. 8 illustrates another embodiment of a wheeled container of the present invention.

As shown in FIGS. 1 & 8, the front compartment (5) hinges from a locked position to an open position where it sits upon the top of the compartment (4) allowing access to both compartments (4) and (5) as shown. In FIGS. 1 & 8, the trays have been removed for clarity.

As shown in FIGS. 1 & 8 the compartments (4) and (5) comprise engagement means in the form of projections (10) spaced down the side walls of each compartment (4 & 5). A tray (11) such as shown in FIG. 2 is supported across opposed projections (10) as shown in FIGS. 3 to 7, such that the trays (11) can swing around the projections (10) without interfering with adjacent trays (11) or touching the sides of the compartment (4 & 5).

Figure 2:
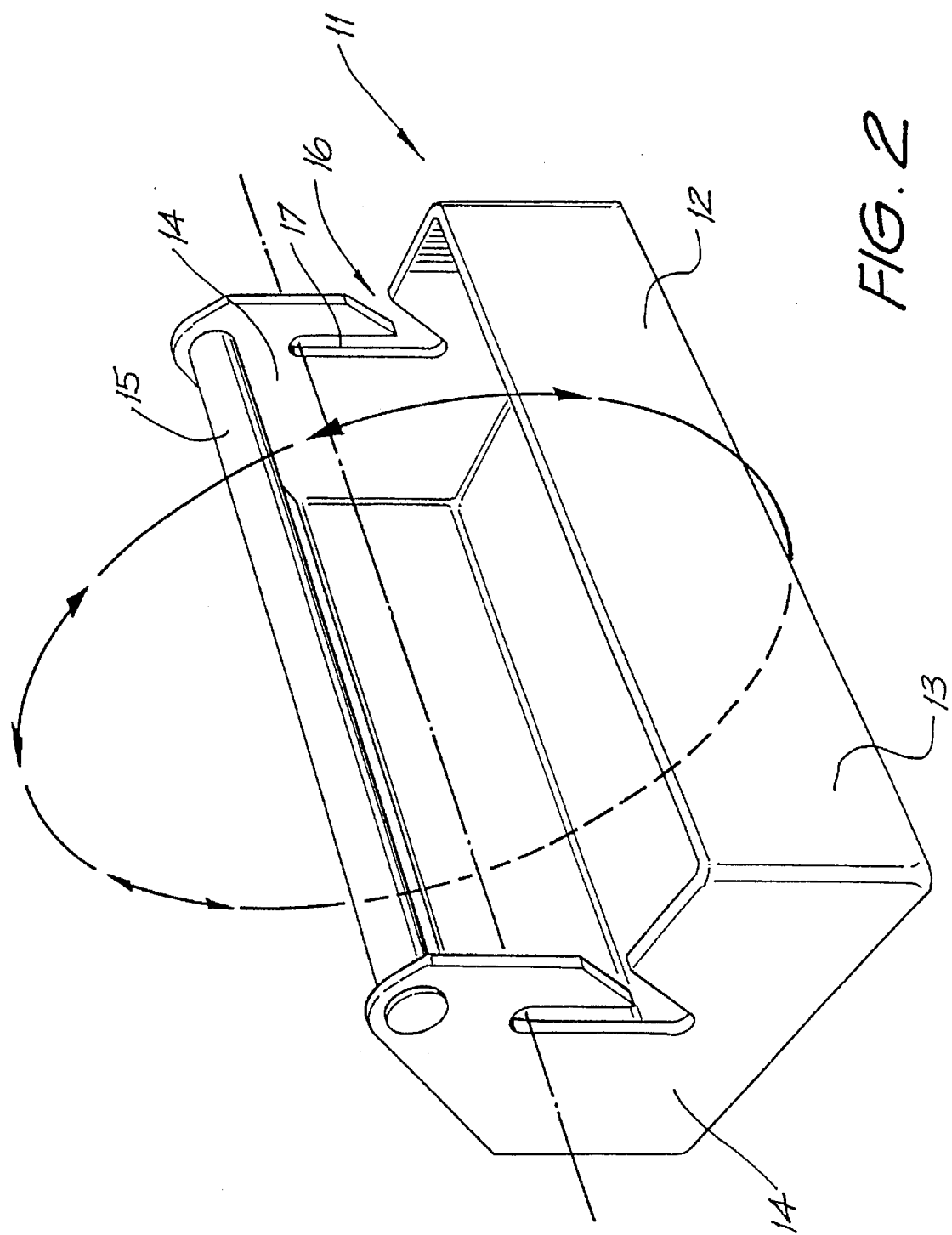
FIG. 2 illustrates a tray for holding items in accordance to one embodiment of the present invention.

A preferred shape of tray (11) is shown in FIG. 2 and comprises a tray body (12) having walls (13) extending around the periphery. The two opposed side walls (14) extend upwardly and are joined by a handle (15). A recess (16) is formed in the side walls (14) to releasably connect onto the projections (10) in the compartments (4) and (5).

The recess can be of any suitable shape, however preferably the recess (16) is in the shape of a J or an inverted 7 with the long arm (17) of the recess substantially vertical, when the tray (11) is supported from the projections (10). This configuration reduces the chance of the tray (11) bouncing off the projections (10) during transportation.

Any number of trays can be located in each chamber (4 & 5), with an open chamber (18) to contain larger objects such as electric saws, drills or the like.

A closed drawer system could be positioned in the chamber (18) if required, and preshaped holding inserts could be positioned in the trays (11) to hold sockets and screw driver sets and the like.

Figures 3, 4:
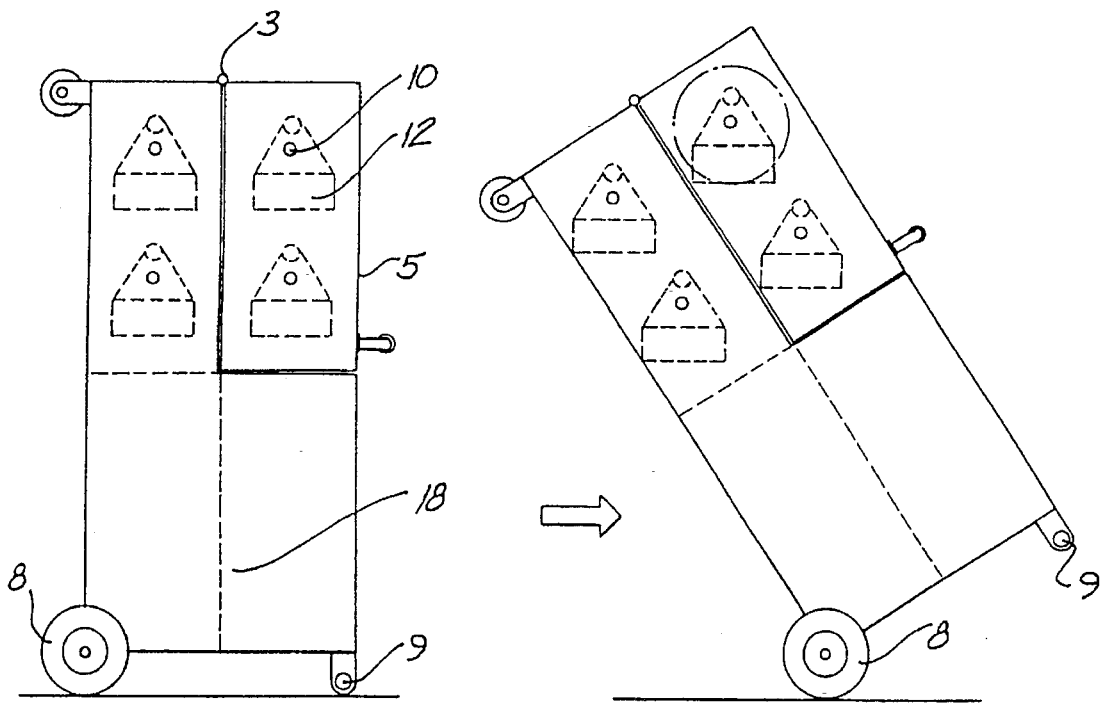
FIG. 3 illustrates a schematic view of a wheeled container according to one embodiment of the present invention, in an upright position.
FIG. 4 illustrates the wheeled container of FIG. 3 in a wheeling position.
Figure 5:
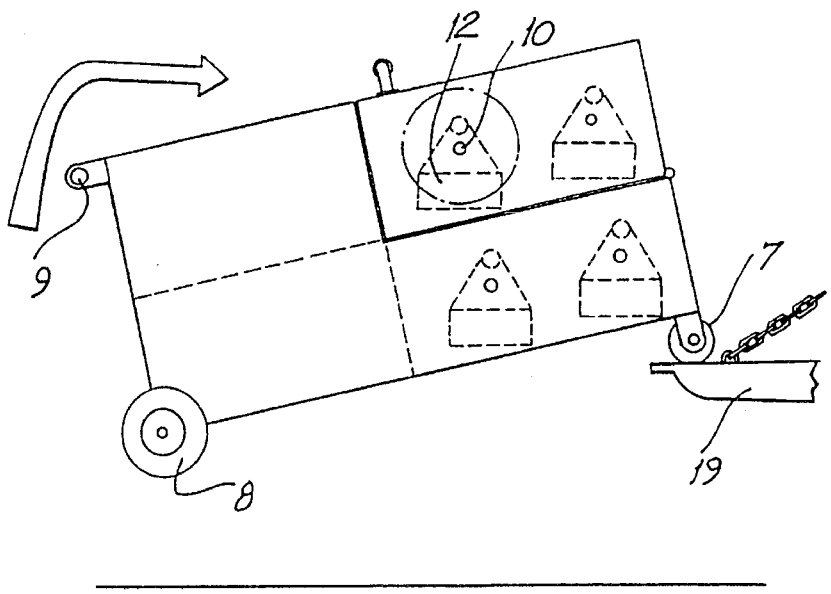
FIG. 5 illustrates the wheeled container of FIG. 3 in a loading position for loading into the back of a vehicle.

As is shown in FIG. 3 the wheeled container (1) is in its upright position with the trays (11) above the open chamber (18) such that heavy items such as power tools are located lower in the cabinet (2).

To move the wheeled container (1) it is simply pivotted onto the wheels (8) and moved to the required position as shown in FIG. 2. To load it onto a van or truck, the wheeled container is moved adjacent the tail gate (19) and tipped such that the roller elements (7) of the handle (6) are on the tail gate (19) and the wheeled container (1) is lifted by the handle (9) and the wheeled container rolled into the van.

The wheels (8) and the roller means (7) cooperating to allow the wheeled container (1) to be easily moved into and out of a van or truck.

Figure 6:
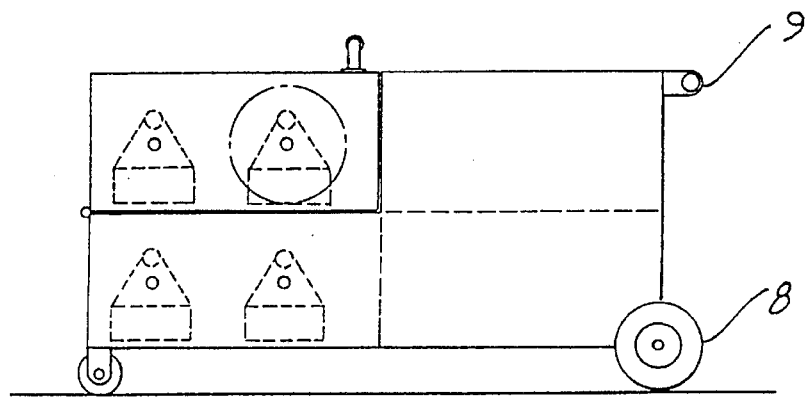
FIG. 6 illustrates the wheeled container of FIG. 3 in lay down position for transportation such as in the back of a van.
Figure 7:
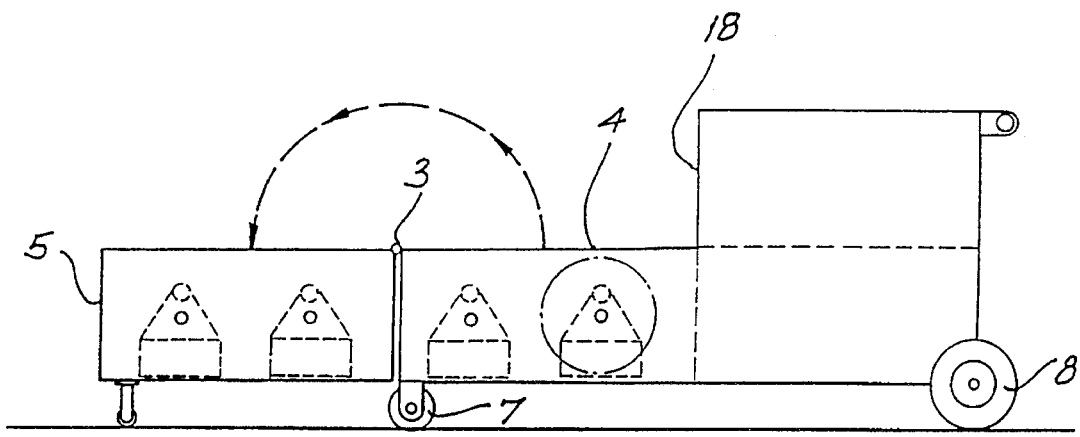
FIG. 7 illustrates the wheeled container of FIG. 3 in a lay down position with the compartments open.

Access can be gained to the various compartments (4 & 5) and the open chamber (18) with the wheeled container (1) in a lay down position, as shown in FIGS. 6 & 7, or in an upright position as shown in FIG. 1 & 8, as the trays (11) are free to rotate about their respective projections (10) as the orientation of the wheeled container (1) alters, as shown in FIGS. 3 to 7.

The trays (11) are easily removed from the projections (10) to be carried as required to the work area.

Further the trays could be mounted in cradles in the side walls of vans in a similar manner to their mounting shown above.

As shown in FIG. 8 the compartments (4 & 5) and the open chamber (18) are the same size, which greatly improves the efficiency of production.

Whilst the above described embodiment has only two compartments, other embodiments could have more and not include the open chamber (18).

Further the compartment (5) could hinge side ways rather than upwardly.

Any form of slotting for engagement with the projections can be used, and the projections could be on the trays with the recesses on the side walls of the compartments.

The various components of the wheeled contained can be made of any suitable material such as metals or plastics.

It should be obvious that modifications and alterations can be made to the above described embodiment without departing from the spirit and scope of the present invention.

I claim:

1. A wheeled container comprising:

a cabinet having a first compartment; a second compartment hingedly connected to said first compartment, said second compartment moveable between a closed position, whereby access to said first compartment and said second compartment is prevented, and an open position allowing access to both said first compartment and said second compartment;

tray means having a tray body in which to receive items, side support means extending upwardly from each side of the tray body, a handle joining across said side supports means, and a slot in each of said side support means in the shape of a J or an inverted 7;

projections located on each side of said first and second compartments, whereby the projections pivotally releasably engage in a respective one of said slots, such that each tray is pivotally held between two opposed projections and can pivot around said two projections without interfering with the movement of adjacent tray means or touching the cabinet when the orientation of said wheeled container is altered, thus keeping the tray bodies in a substantially horizontal position;

wheels located at or adjacent the back bottom edge of said cabinet;

a handle located at or adjacent the top back edge of said cabinet; and roller elements located on said handle to allow the cabinet to easily move on said roller elements when said wheeled container is laid over.

2. A wheeled container according to claim 1 wherein said second compartment pivots about a transversly extending axis relative to the wheeled container.

3. A wheeled container according to claim 1 wherein there is a further compartment located adjacent both the first and second compartments whereby when said second compartment is in its closed position access to said further compartment is blocked, and when said second compartment is in its open position access to said further compartment is available.

\* \* \* \* \*